(12) United States Patent
Berkhoel

(10) Patent No.: US 7,344,577 B2
(45) Date of Patent: Mar. 18, 2008

(54) FILTER FRAME FOR BAG HOUSE FILTER, AND METHOD

(75) Inventor: James Leonard Berkhoel, Woodbury, MN (US)

(73) Assignee: Donaldson Company, Inc., Minneapolis, MN (US)

( * ) Notice: Subject to any disclaimer, the term of this patent is extended or adjusted under 35 U.S.C. 154(b) by 442 days.

(21) Appl. No.: 10/997,465

(22) Filed: Nov. 24, 2004

(65) Prior Publication Data
US 2006/0107632 A1    May 25, 2006

(51) Int. Cl.
*B01D 27/06* (2006.01)

(52) U.S. Cl. .............................. 55/357; 55/493; 55/497; 55/498; 55/500; 55/521; 210/493.1; 210/493.2; 210/493.5; 210/237

(58) Field of Classification Search .................. 55/493, 55/497, 498, 500, 521, 357; 210/493.1, 493.2, 210/493.5, 237
See application file for complete search history.

(56) References Cited

U.S. PATENT DOCUMENTS

| | | | |
|---|---|---|---|
| 3,836,005 A | | 9/1974 | Bauer |
| 4,323,376 A | * | 4/1982 | Rosenquest ................... 55/304 |
| 4,775,469 A | * | 10/1988 | Zimmerly ................... 210/237 |
| 4,810,379 A | | 3/1989 | Barrington |
| 4,818,398 A | * | 4/1989 | Lott et al. .................... 210/238 |
| 5,211,846 A | | 5/1993 | Kott et al. |
| 5,223,005 A | * | 6/1993 | Avondoglio ................. 95/280 |
| 5,487,767 A | | 1/1996 | Brown |
| 5,601,717 A | * | 2/1997 | Villette et al. ........... 210/493.1 |
| 5,624,559 A | | 4/1997 | Levin et al. |
| 5,897,787 A | | 4/1999 | Keller |
| 5,966,793 A | * | 10/1999 | Pyron .......................... 29/252 |
| 6,017,379 A | | 1/2000 | Kauffman |
| 2004/0050767 A1 | | 3/2004 | O'Hern et al. |
| 2006/0201117 A1 | * | 9/2006 | Regnier ..................... 55/341.1 |

FOREIGN PATENT DOCUMENTS

GB    1 284 403    8/1972

* cited by examiner

*Primary Examiner*—Duane Smith
*Assistant Examiner*—Minh-Chau T. Pham
(74) *Attorney, Agent, or Firm*—Merchant & Gould, P.C.

(57) ABSTRACT

A filter tube frame for use with a filter bag house. The filter tube frame includes an end cap having a pivotable handle attached thereto to facilitate removal of the tube frame from the bag house. The handle includes a lever surface adapted to engage a tube sheet surface, thus, during use, providing a force to urge the end cap away from the tube sheet and unseat the filter tube frame from the tube sheet.

17 Claims, 4 Drawing Sheets

US 7,344,577 B2

FILTER FRAME FOR BAG HOUSE FILTER, AND METHOD

FIELD OF THE INVENTION

The present invention relates to bag house dust collectors. It particularly concerns a filter collar or tube frame flange for a bag filter, in bag houses. The disclosure also concerns methods of use.

BACKGROUND OF THE INVENTION

Bag house dust collectors are generally used to filter particulate material from industrial off gases, before the gases are vented or cycled. The arrangements generally include flexible filter bags supported within the construction. The filter bags are generally secured to a tube sheet, which separates the clean air side from the dirty air side of the filter system or collector. A filter cage or filter tube frame, which has a collar at one end, secures the bag to the tube sheet. The cage or frame also keeps the bag from collapsing and keeps the bag generally steady in the air flow streams.

Large industrial bag house dust collectors may include hundreds of filter tubes and bags therein. These bags must occasionally be removed from the tube sheet, for example, for maintenance or replacement. In order to remove the bag and the filter tube frame from the tube sheet, the collar and bag must be unseated or unsealed from the tube sheet and then the bag and frame must be lifted out of the aperture in which the bag and frame are seated; this is typically done by the operator reaching at least partially into the bag and frame in order to gain a secure grip. The force needed to unseat and remove the bag and filter tube frame from the tube sheet can be 30 to 45 pounds force.

SUMMARY OF THE INVENTION

According to the present invention, a filter tube frame for use with a bag filter is provided. The filter tube frame includes a handle to facilitate the removal of the tube frame and bag filter from a tube sheet, when operably mounted in a tube sheet. The handle provides a sturdy gripping surface. Additionally, the handle provides a mechanical advantage when removing the filter tube frame from the tube sheet. The mechanical advantage decreases the actual force needed by the operator to remove the bag and filter tube frame.

The handle has a body that defines the gripping surface and a distal end at each end of the handle. At least one of the distal ends provides a lever surface or arm that engages against the tube sheet. The lever surface of the distal end facilitates removal of the filter tube frame from the tube sheet by providing a force that urges the tube frame away from the tube sheet. The handle design of the present invention can decrease the conventional force needed to release the compression fit and remove the filter tube frame and bag from the tube sheet from 30 to 45 pounds force to about 6 to 10 pounds force.

In one particular embodiment, a handle having two distal ends with lever surfaces, the distal ends extending about 0.812 inch from the pivot points, decreases the force needed from 30 pounds to about 6.6 pounds force, and decreases a needed force of 45 pounds to about 9.9 pounds force.

In one particular embodiment, the present invention is directed to a filter tube frame having a first end and a second opposite end, an end cap at the first end, the end cap having a top surface and a lower edge, and a handle pivotably mounted on the end cap. The end cap has a body and a first end, and a pivot point located on the handle between the body and the first end. The end is preferably a lever surface with a portion defined by a radius. The lever surface may include a cam surface. The handle is movable from a first position to a second position; when in the first position, at least a portion of the handle body and the first end are positioned between the top surface and the lower edge, and, when in the second position, the top surface and the lower edge positioned between the handle body and the handle first end. The handle can include a second end opposite to the first end, the second end having a lever surface.

According to the present invention, methods of removing and replacing a bag filter are provided. A method for removing a filter tube frame from a tube sheet, the filter tube frame being held within the tube sheet with a compressive force, includes: grasping a handle body, pivoting the handle body away from the tube sheet and pivoting a distal end of the handle toward the tube sheet, contacting the tube sheet with the distal end, releasing the compressive force holding the filter tube frame, and extracting the filter tube frame from the tube sheet.

DETAILED DESCRIPTION OF THE PREFERRED EMBODIMENT

Figure 1:
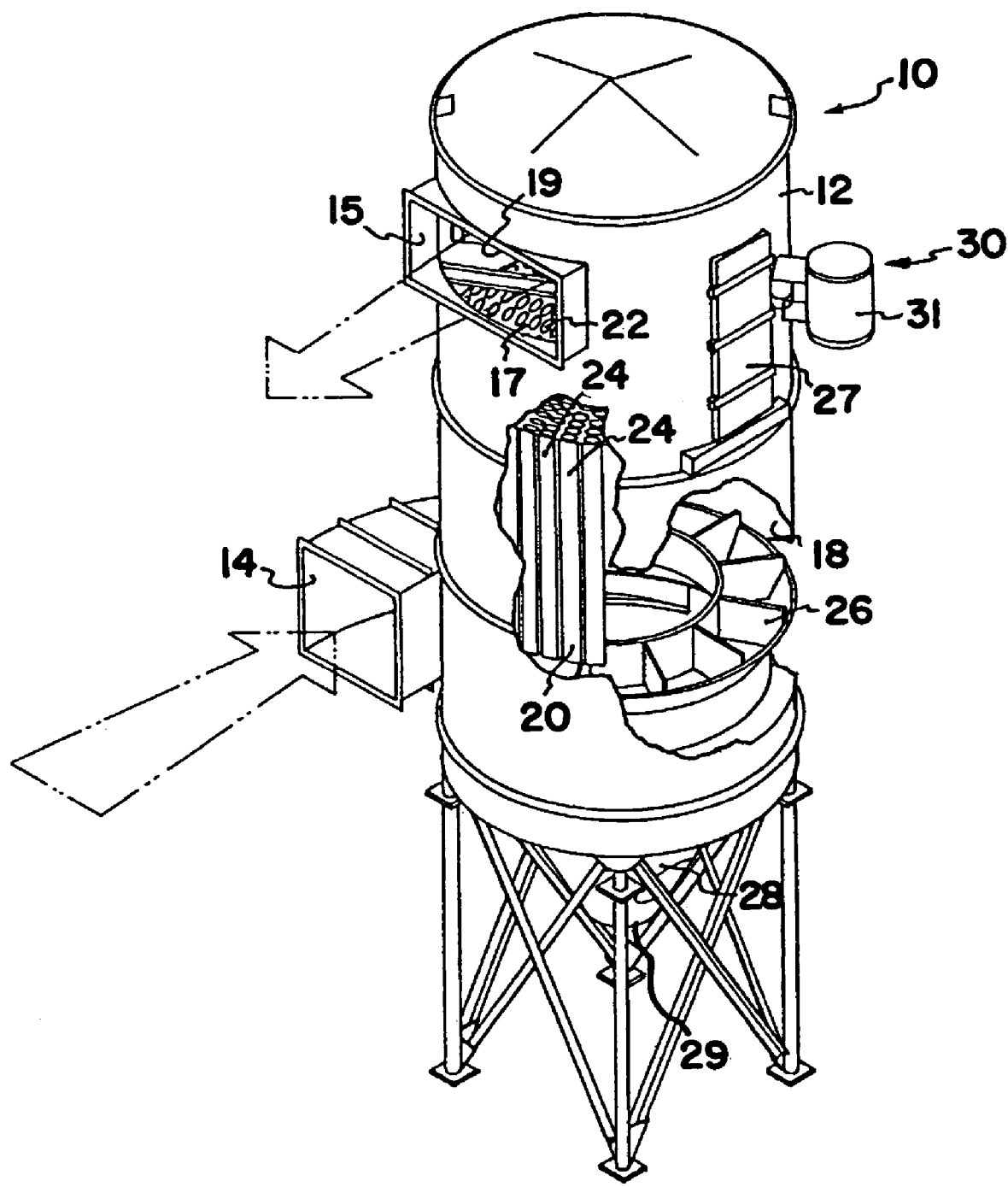
FIG. 1 is an isometric view of a bag house dust collector, with portions being shown broken away to show internal detail.

The reference numeral 10, FIG. 1, generally designates a dust collector or bag house incorporating a filter tube frame according to the present invention. Except as described herein with respect to the connector assembly or arrangement, the dust collector 10 may be a conventional dust collector. The details shown in the drawing depicted are of a Donaldson Model RFW RF dust collector, appearing in a Donaldson Company, Inc. 1994 publication. A reason that the drawing of FIG. 1 is not labeled as prior art, is because according to the present description, it includes a filter tube frame according to the present invention therein. It is noted, however, that in FIG. 1 details of the filter tube frame are not viewable.

Still referring to FIG. 1, dust collector 10, which is depicted with portions broken away, includes an outer housing 12 having a dirty air inlet 14 and a clean air outlet 15. Tube sheet 17 separates housing 12 into a dirty air side or section 18 and a clean air side, section or plenum 19. Extending into dirty air section 18 are a plurality of spaced filter tubes or bags 20. Each filter tube or bag 20 has a clean air exit port or open end 22 associated with or adjacent to tube sheet 17. During operation, clean air exits from open end 22 into clean air section 19.

In operation, dirty air passes into housing 12 through dirty air inlet 14. The air is then directed through filter tubes or bags 20. As the air enters bags 20, particulate material carried in the air is trapped on outer walls 24 of bags 20. Clean air passes through the filtering walls of bags 20 to the inside of bags 20, then passes upwardly and exits through open ends 22 (of bags 20), as sealingly carried by tube sheet 17 and into clean air section 19. The clean air is then exhausted or vented through clean air outlet 15.

For the arrangement shown, dust collector 10 includes an inlet baffle construction 26, a filter tube access door 27, a dust collector hopper 28, and a dust outlet 29, in a manner known in the art.

In addition, the arrangement shown includes a compressed air apparatus generally designated at 30, for periodic cleaning of filter tubes or bags 20. In general, this compressed air apparatus 30 provides for selected periodic pulses of pressurized gas in a direction of backflow through filter tubes or bags 20. This will push collected dust off of the bag outer walls 24, causing the dust to fall into hopper 28, from which it can be removed via dust outlet 29. A pressurized air reservoir for use in conducting this cleaning operation is depicted at 31. Compressed air cleaning arrangements of the type depicted and described are also conventional for dust collectors.

In a large industrial dust collector of the type shown in FIG. 1, tube sheet 17 will typically include from 48 to 484 holes therein, for attachment of individual filter bags 20. The arrangement, then, will typically include 48 to 484 filter bags 20.

At initial startup, it is necessary to install filter bags 20. This is generally done by a worker who enters through access door 27 and stands on or over tube sheet 17 and installs bags 20 through tube sheet 17. Periodically thereafter, filter bags 20 need to be serviced or replaced, which requires filter bags 20 to be removed from tube sheet 17, generally in opposite manner in which they were installed. Filter bags 20 are supported by a filter tube frame, which inhibits the bag from collapsing and which also provides a grip for removing filter bag 20 from tube sheet 17. In order to remove bag 20, it is also necessary to remove the filter tube frame from tube sheet 17. It is presently estimated that through the lifetime of an apparatus such as dust collector 10, each of filter bags 20 will be removed and replaced at least 20 to 40 times.

The present disclosure illustrates a preferred filter tube frame, which facilitates the removal of filter tubes 20 from tube sheet 17 in a relatively convenient and relatively efficient manner. A filter tube frame according to the present invention is depicted in FIGS. 2-6, where like reference numerals designate like elements.

Figure 2:
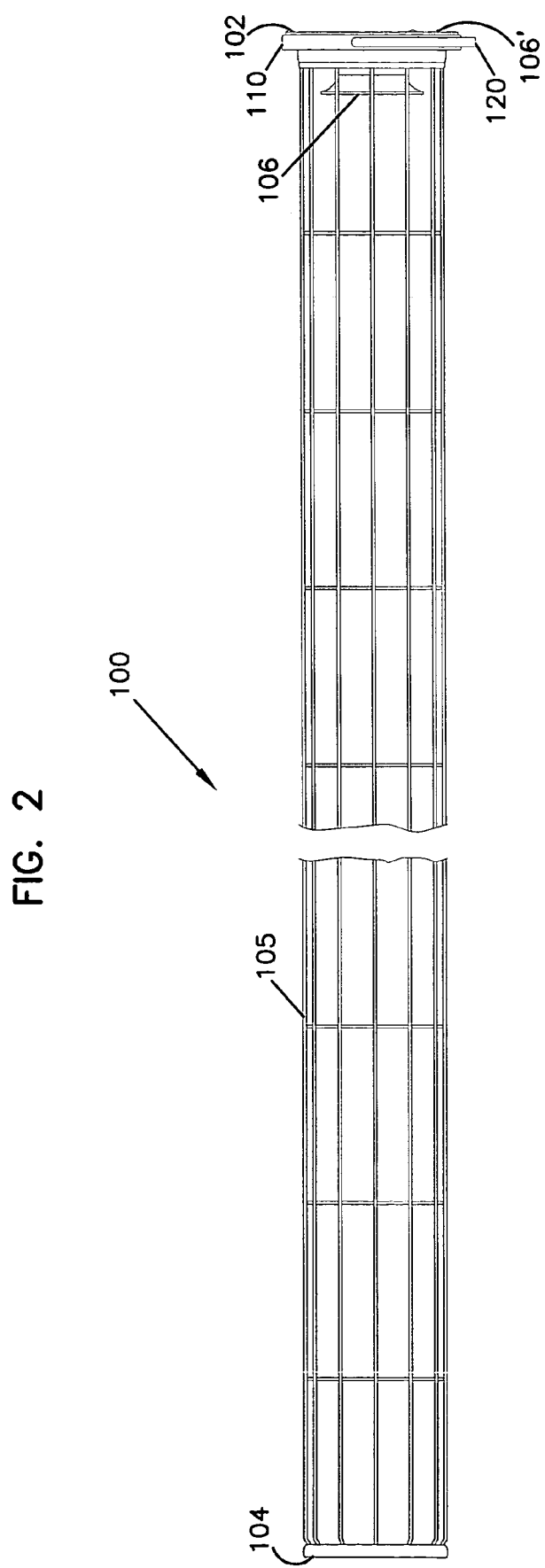
FIG. 2 is a side view of a filter tube frame according to the present invention used in the bag house of FIG. 1.

Referring to FIG. 2, a filter tube frame 100 is depicted. Filter tube frame 100 has a first end 102, an opposite second end 104, and a cage 105 extending therebetween. Cage 105 is generally a cylindrical cage made from a plurality of metal rods; it is understood that other configurations can be used for cage 105, such as an oval, ellipse, or other shape. Cage 105 is typically at least about 25 inches long and usually no greater than about 180 inches (15 feet), however in some designs, longer cages 105 may be used. Cage 105 may be open or closed at second end 104. An end cap 110 is secured to first end 102 of cage 105. The framework represented by cage 105 can be connected to end cap 110, for example by welding. Additionally, in this embodiment, positioned within cage 105 at first end 102 is a Venturi 106, for altering the flow of air at first end 102. Venturi 106 includes a top plate 106'; a first portion of Venturi 106 opposite top plate 106' extends into cage 105. A second portion of Venturi 106 extends through end cap 110, and will be further described below.

Figure 3:
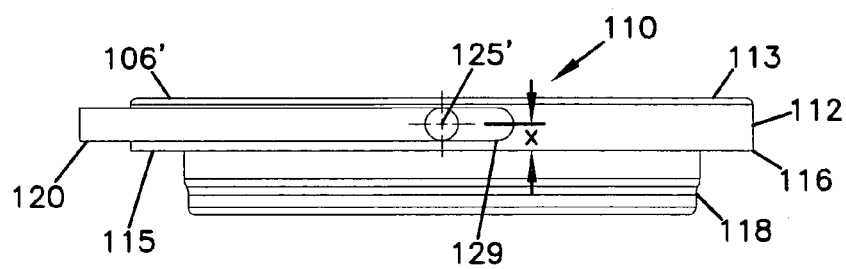
FIG. 3 is a side view of an end cap of the filter tube frame of FIG. 2.
Figure 4:
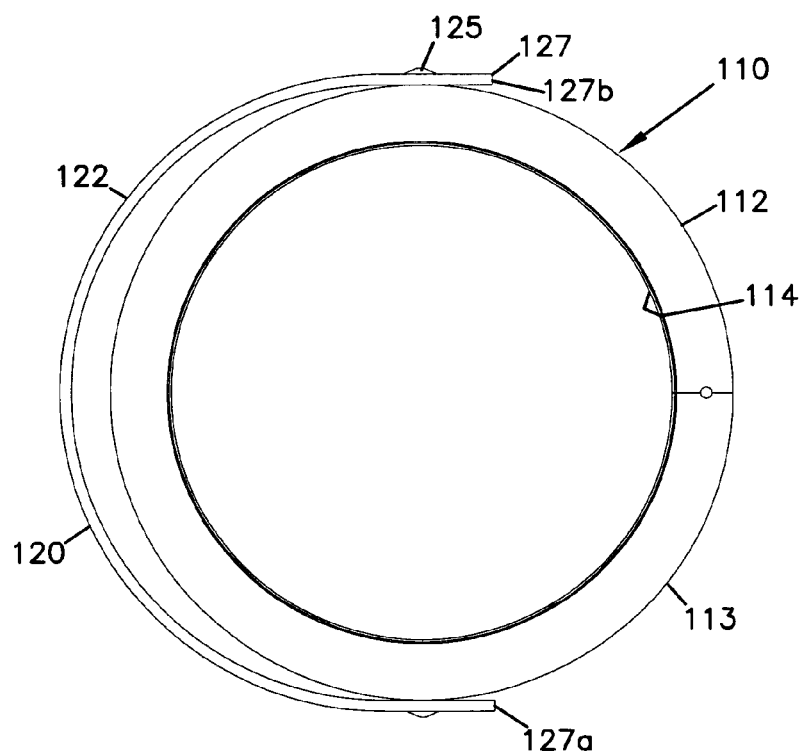
FIG. 4 is a top view of the end cap of FIG. 3.

Attention is now directed to FIGS. 3 and 4, which depict various views of tube frame end cap 110. End cap 110 has a flange 113 which is generally defined by an outer periphery 112, best seen in FIG. 4 where a top plan view of end cap 110 is depicted; in this embodiment, flange 113 and outer periphery 112 are circular to correspond to cylindrical cage 105. Flange 113 also has an inner rim 114 which defines an internal aperture. The second portion of Venturi 106, mentioned above, extends through inner rim 114 of flange 113 so that top plate 106' of Venturi 106 is positioned on flange 113; top plate 106' forms a top surface of end cap 110. Venturi 106 is typically attached to flange 113 by bolts or rivets through top plate 106'.

As seen in FIG. 3, flange 113 of end cap 110 at outer periphery 112 includes a lower edge 116, the use of which as a seat will be described below. Between inner rim 114 and periphery 112 (and edge 116), a recess or cavity 115 is provided. Recess 115 extends from lower edge 116 and is adapted for accepting a top portion of filter bag 20 therein when bag 20 and filter tube frame 100 are mounted into tube sheet 17; this will also be further described below. Extending from flange 113 is a collar 118, whose function is to provide compressive fit and support to bag 20 when mounted on filter tube frame 100. Collar 118 is sized to fit between Venturi 106 and cage 105. End cap 110 has a handle 120 pivotally attached to periphery 112.

Handle 120 has an elongate body 122 defined by distal ends 127, specifically, first distal end 127a and opposite second distal end 127b. Positioned between distal end 127 and body 122 is a pivot point 125', at which attachment member 125 connects handle 120 to end cap 110. Distal end 127 extends past attachment member 125. Handle 120 is pivotable around two pivot points 125' positioned opposite or across from each other on outer periphery 112 (e.g., 180 degrees) of end cap 110. Pivot point 125' is located at attachment member 125, and handle 120 extends between one pivot point 125' and attachment member 125 and the opposite pivot point 125' and attachment member 125.

Pivot point 125' is located a distance "x" from lower edge 116 of periphery 112. Preferably, pivot point 125' is positioned at the center of the width of handle 120.

Handle 120 is usually metal, for sufficient strength, and may be generally flat, circular, or have any other suitable cross-sectional shape. The shape of handle 120 may vary along its length from first distal end 127a to second distal end 127b. Body 122 may include features to improve gripping of handle 120, features such as knurling or other texture.

Handle 120 is generally semi-circular in shape and, when generally parallel to outer periphery 112 as illustrated in FIG. 3, handle 120 extends out and away from outer periphery 112 of flange 113. The amount of extension of handle 120 from outer periphery 112 should be sufficient to allow a maintenance worker or other user to be able to get at least part of their fingers between handle 120 and periphery 112. Often, a space of at least 0.25 inch is sufficient, although a space of at least 0.5 inch is more comfortable. The distance between handle 120 and outer periphery 112 is at least 0.25 inch; this distance is no more than about 2 inches. Typically, the distance is 0.5 to 1.5 inches, and preferably, the distance is about 0.5 to 0.75 inch.

The length of handle 120 depends on the size of flange 113 and end cap 110 and is usually at least one-half of the distance or length of outer periphery 112, or, of the perimeter of flange 113. This provides the extension of handle 120 between the two pivot points 125'. The length also includes some extra to accommodate the extension of handle 120 from outer periphery 112 (as described above) and includes some extra to accommodate for distal ends 127 of handle 120.

At least one of distal ends 127, that is, at least one of end 127a and end 127b, extends past pivot point 125' a distance of at least "x", the distance from pivot point 125' to lower edge 116. Preferably, both distal ends 127a, 127b extend past pivot point 125 a distance of at least "x". Distal end 127 extends at least 0.25 inch past pivot point 125' and no more than about 4 inches. Preferably, this distance is about 0.5 to 1.5 inch, more preferably about 0.75 to 1 inch.

Distal end 127 that extends past pivot point 125' has a shape that provides a lever surface 129. In the embodiment illustrated in FIG. 3, lever surface 129 includes a radius region that has a smooth curved edge positioned between attachment member 125 and distal end 127. Advantages of lever surface 129 will be described below. In preferred designs, both ends 127a, 127b have lever surface 129. In some embodiments, lever surface 129 may include a cammed portion or cam surface.

In operation, the filter tube or bag 20, which is of a flexible fabric construction, is snapped into an aperture in tube sheet 17. The top end of bag 20 usually includes a soft, polymeric o-ring, which is sized to fit into recess 115 of end cap 110. Once bag 20 is engaged in tube sheet 17, filter tube frame 100 is slid into bag 20 until end cap 110 contacts tube sheet 17, particularly, lower edge 116, and any o-ring at the top of bag 20 seats within recess 115. Thus, frame 100 is positioned inside bag 20 during use, and provides internal support for bag 20. See FIG. 5, although no bag 20 is illustrated. Filter tube frame 100 is typically secured into tube sheet 17 by a radial compressive friction fit. Stepping on flange 113 is a typically way for the operator to assure that frame 100 and bag 20 are locked into position.

Figure 5:
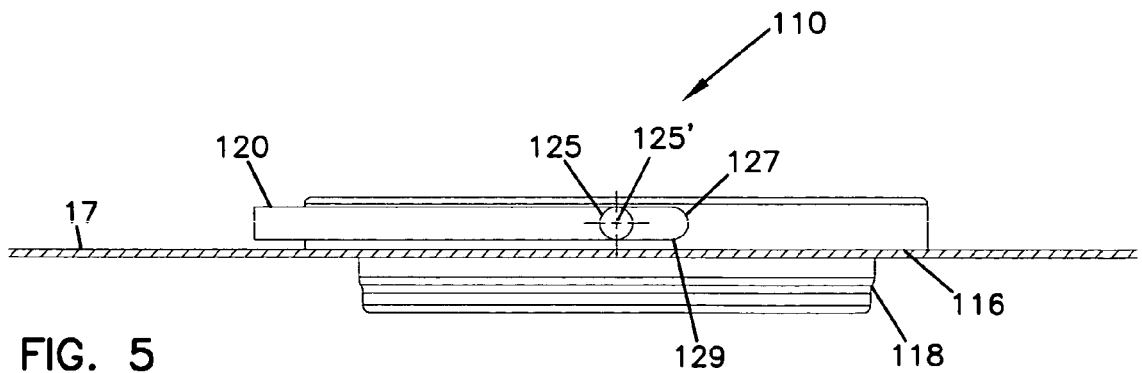
FIG. 5 is a side view of the end cap of FIG. 2 positioned as if the filter tube frame were inserted in a tube sheet, illustrating a handle thereof in a first position.

During filtration, handle 120 is positioned in a flat or downward position, such as illustrated in FIG. 5. Preferably, no portion of handle 120 is positioned within the aperture defined by inner rim 114; any protrusion of handle 120 into that aperture could detrimentally alter the air flow patterns and reduce filtering efficiency. As seen in FIG. 5, distal end 127 is positioned above the level of lower edge 116.

Figure 6:
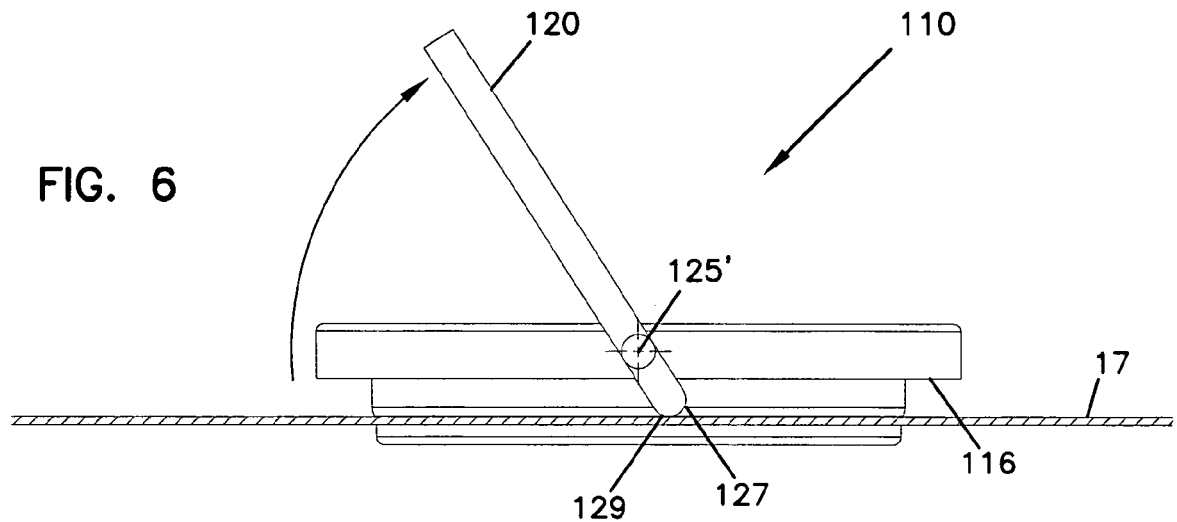
FIG. 6 is a side view of the end cap of FIG. 5 with the handle in a second position, illustrating the end cap partially raised from the tube sheet.

When it is desired to remove the bag and filter tube frame 100 from tube sheet 17, for example, to remove and replace bag 20, handle 120 is grasped by the operator or maintenance person and pivoted around pivot point 125'. See FIG. 6. Typically, handle 120 is lifted about 0.5 inch to allow an operator's fingers to grasp under handle 120. As handle 120 is pivoted upward, distal end 127 drops below lower edge 116 (that is, distal end 127 gets closer to second end 104 of filter tube frame 100) until lever surface 129 of distal end 127 contacts tube sheet 17. Distal end 127, specifically lever surface 129, urges end cap 110 and bag 20 away from tube sheet 17 as handle 120 is raised, as indicated in FIG. 6. Because a portion of handle 120 larger than distal end 127 is being lifted by the operator, a mechanical advantage is achieved. Distal end 127 with lever surface 129 facilitates the removal or extraction of filter tube frame 100 from tube sheet 17.

To replace filter tube frame 100 into tube sheet 17, generally the reverse action is used. Handle 120 can be used to lower tube frame 100 into tube sheet 17. Once properly aligned, handle 120 should be pivoted and positioned generally parallel to tube sheet 17 (as illustrated in FIG. 5) and end cap 110 fitted into place.

A Particular Preferred Filter Tube Frame

A particular preferred filter tube frame 100 as depicted in FIG. 2, having an end cap 110 as depicted in FIGS. 3 through 6, would be as follows.

Cage 105, from first end 102 to second end 104, is usually about 48 inches to 144 inches long with a diameter of about 4 to 18 inches. One preferred length is 120 inches and one preferred diameter for cage 105 is about 6 inches. Cage 105 is made from metal, such as mild steel, galvanized steel, or #304 stainless steel.

End cap 110, present at first end 102, includes flange 113 defining outer periphery 112 and inner rim 114; in one preferred embodiment, flange 113 has an outer diameter, defined by outer periphery 112, of about 7 inches, and an inner diameter, defined by rim 114, of about 5.7-6 inches. Flange 113 is often made from metal and is welded to cage 105. Inner rim 114 is preferably aligned with cage 105. Outer periphery 112 includes lower edge 116. Recess 115 is generally the depth of exposed outer periphery 112, or close thereto. In one preferred embodiment, recess 115 has a depth of about 0.6 inch.

Attached at periphery 112 is handle 120; preferably, handle 120 is attached at two pivot points 125' via rivets 125 directly opposite one another on flange 113; that is, pivot points 125' are preferably separated by 180 degrees.

Handle 120, from first distal end 127a to second distal end 127b is usually about 12 to 18 inches long; one preferred length for handle 120 is about 13.7 inches for use with a flange having a diameter defined by outer periphery 112 of about 7 inches. The length of handle 120 is such that handle 120 extends out from outer periphery 112 of flange 113 when handle 120 is operationally mounted to flange 113. The space between handle 120 and flange 113 should be sufficient to allow a maintenance worker or other user to be able to get at least part of their fingers between handle 120 and flange 113. Usually, the distance the handle extends from periphery 112 is 0.5 to 1 inch; in one particularly preferred embodiment, this distance is about 0.545 inch.

As stated above, handle 120 may be flat, round, obround, or any other suitable shape. Handle 120 is preferably no thicker than the distance between top 106' and lower edge 116. When handle 120 is flat, it is usually about 0.25 inch to 1 inch; one preferred width is 0.375 inch. Handle 120 can be made from 0.125 inch thick steel.

The length from pivot point 125' to distal end is at least "x", typically at least the thickness of flange 113, and no more than about 4 inches. Often, this distance is 0.5 inch to 1.5 inches, more often, about 0.5 inch to 1 inch, or 0.75 inch to 1 inch. One preferred length is about 0.8 inch, particularly, 0.813 inch. Distal end 127 includes lever surface 129; one preferred lever surface 129 has about a lever surface 129 defined by a radius of about 0.2 inch.

It is to be understood that even though numerous characteristics and advantages of the present invention have been set forth in the foregoing description, together with details of the structure and function of the disclosure, such disclosure is illustrative only, and is not intended to be limiting to the scope of the invention in any manner, other than by the appended claims. The specific dimensions referenced in this description provide one preferred embodiment of a filter tube frame and an end cap. The invention is not to be limited to the described embodiments, or to the use of specific components, configurations or materials described herein. Equally preferred designs and embodiments can be obtained with appropriate variation. All alternative modifications and variations of the present invention which fall within the broad scope of the appended claims are covered.

I claim:

1. A filter tube frame comprising:
   (a) a first end and a second opposite end;
   (b) an end cap at the first end, the end cap having a body with a top surface, a periphery, and a lower edge;
   (c) a handle pivotably mounted to the end cap, the handle having a body and a first end and a second end, the handle movable from a first position to a second position; and
   (d) a first pivot point located on the handle between the body and the first end and a second pivot point located on the handle between the body and the second end; wherein the handle, when in the first position, has at least a portion of the handle body and the first end and the second end positioned between the top surface and the lower edge, and, the handle, when in the second position, has the handle body above the top surface of the end cap and the handle first end and the handle second end below the lower edge of the end cap.

2. The filter tube frame according to claim 1, wherein the first end has a lever surface.

3. The filter tube frame according to claim 2, wherein the lever surface includes a radius portion.

4. The filter tube frame according to claim 2 wherein the second end has a lever surface.

5. The filter tube frame according to claim 1, wherein the handle is pivotally mounted to the end cap at the first pivot point proximate the first end and at the second pivot point proximate the second end.

6. The filter tube frame according to claim 1, wherein the handle, when in the first position, extends from the periphery of the end cap at least 0.25 inch.

7. The filter tube frame according to claim 6, wherein the handle, when in the first position, extends from the periphery of the end cap at least 0.5 inch.

8. The filter tube frame according to claim 1, wherein a distance between the first pivot point and the first end of the handle is at least 0.5 inch.

9. The filter tube frame according to claim 8, wherein a distance between the first pivot point and the first end of the handle is about 0.8 inch.

10. The filter tube frame according to claim 1, further comprising a cage extending from the end cap to the second end of the filter tube frame.

11. A filter tube frame end cap, the end cap comprising:
    (a) a flange having an outer periphery and an inner rim, the inner rim defining an air flow path;
    (b) a handle pivotally attached to the outer periphery at a first pivot point and at a second pivot point, the handle having a length between the pivot points at least one-half of the flange periphery; and
    (c) the handle having a first distal end extending past the first pivot point at least 0.25 inch and a second distal end extending past the second pivot point.

12. The end cap according to claim 11, wherein each of the first distal end and the second distal end has a radiused lever surface.

13. The end cap according to claim 11, wherein the second distal end extends past the second pivot point at least 0.25 inch.

14. The end cap according to claim 13, wherein each of the first distal end and the second distal end has a radius cam surface.

15. A method of removing a filter tube frame from a tube sheet, the filter tube frame being held within the tube sheet with a compressive force, the method comprising:
    (a) grasping a handle body, the handle body being pivotally attached to the filter tube frame;
    (b) pivoting the handle body away from the tube sheet and pivoting a distal end of the handle toward the tube sheet;
    (c) contacting the tube sheet with the distal end of the handle; and
    (d) after contacting, releasing the compressive force holding the filter tube frame, and extracting the filter tube frame from the tube sheet.

16. The method according to claim 15, wherein the step of pivoting the handle body away from the tube sheet and pivoting a distal end of the handle toward the tube sheet comprises:
    (a) pivoting the handle body away from the tube sheet and pivoting a first distal end and a second distal end of the handle toward the tube sheet.

17. The method according to claim 16, wherein the step of contacting the tube sheet with the distal end comprises:
    (a) contacting the tube sheet with the first distal end and the second distal end.

* * * * *